May 22, 1934.  B. WITTKUHNS ET AL  1,959,804
NONCONTACTING FOLLOW-UP SYSTEM
Original Filed July 27, 1929  3 Sheets-Sheet 1

INVENTORS
BRUNO WITTKUHNS &
FREDERIC M WATKINS
BY
Herbert H. Thompson
their ATTORNEY.

May 22, 1934.    B. WITTKUHNS ET AL    1,959,804
NONCONTACTING FOLLOW-UP SYSTEM
Original Filed July 27, 1929    3 Sheets-Sheet 2
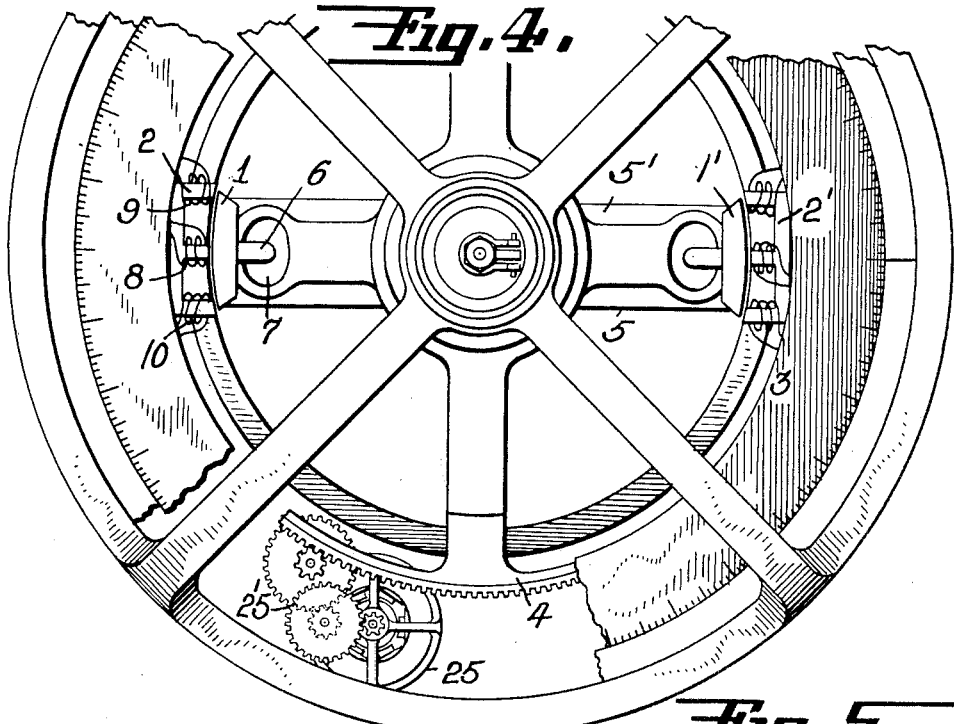
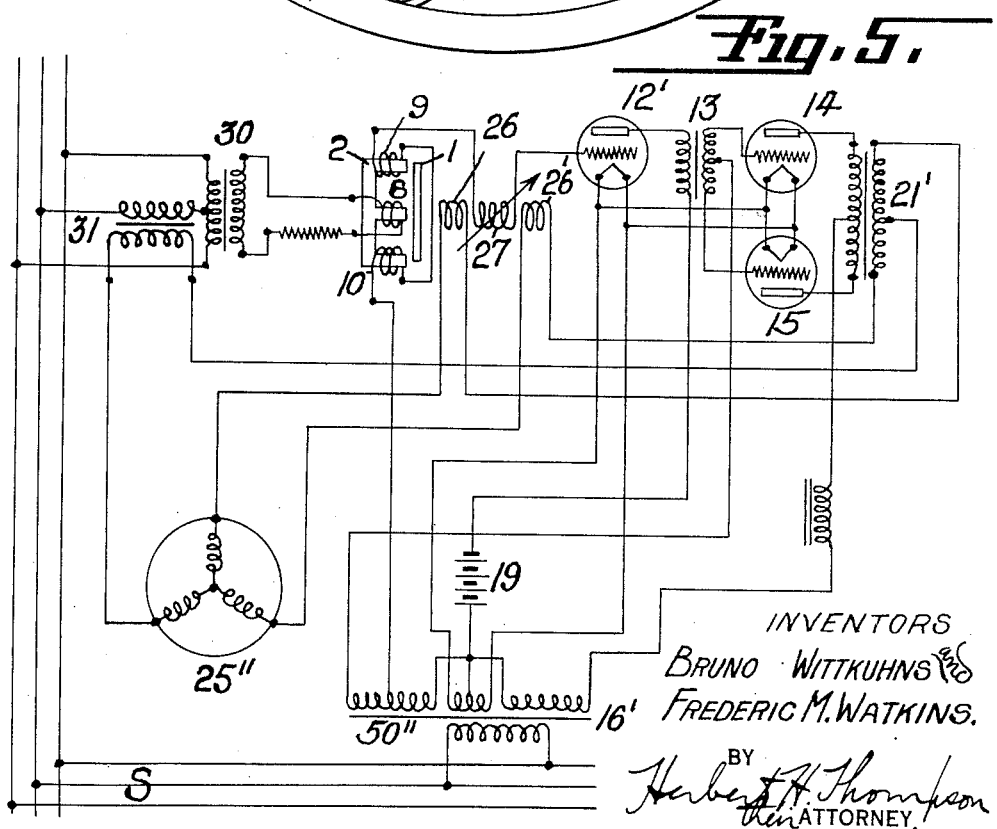
INVENTORS
BRUNO WITTKUHNS &
FREDERIC M. WATKINS.
BY Herbert H. Thompson
their ATTORNEY.

Patented May 22, 1934

1,959,804

UNITED STATES PATENT OFFICE 1,959,804

NONCONTACTING FOLLOW-UP SYSTEM

Bruno Wittkuhns, Chatham, N. J., and Frederic M. Watkins, Forest Hills, N. Y., assignors to Sperry Gyroscope Company, Inc., Brooklyn, N. Y., a corporation of New York Application July 27, 1929, Serial No. 381,660
Renewed February 18, 1933

10 Claims. (Cl. 172—239)

This invention relates to means for controlling the direction of rotation, torque and speed of a power motor by non-contacting or mere influence controlling means in which substantially all torques, usually introduced by such means, are eliminated. The invention has special application to the so-called follow-up and remote control systems such as used to actuate the follow-up elements of gyrocompasses or other sensitive devices or the remote control of repeater compasses, searchlights, and the like. According to this invention the controlling element comprises a variable inductive device or transforming means continuously supplied from an A. C. source in which the output of opposed windings of the transformer or transformers is normally balanced but is disturbed by the relative movement of the parts of the device so as to create a differential output which is combined with another phase or phases of said supply to drive the power motor in the proper direction to return the parts to their original position. In order to reduce the torque which would otherwise be imposed by such a device on the sensitive element of the system, we use a small energy input and employ an amplifying circuit between the controller and the power motor in which circuit we introduce a novel power multiplying device whereby a powerful current is supplied to the power motor which results in a torque equal to or even larger than the torque exerted at full speed even though the motor is running very slowly near its neutral or dead position.

Referring to the drawings in which several preferred forms of the invention are shown:

Fig. 4 is a plan view showing how our invention would be applied to drive the follow up element of a gyrocompass.

Fig. 5 is a wiring diagram showing a still further modification in which the C batteries are eliminated.

Figure 1:
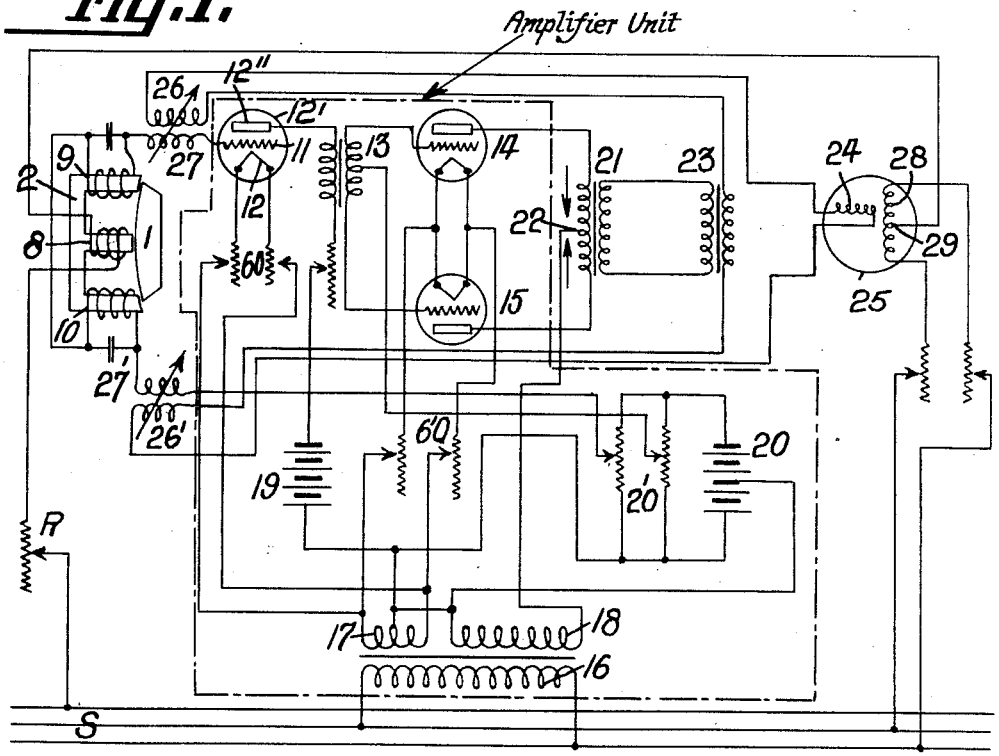
Fig. 1 shows a wiring diagram of the form of the invention employing a two-phase reversible A. C. motor of special design as a power motor.

As the preferred form of controlling means of our invention we employ a two-part inductive device or transformer, one part of which 1 (Fig. 4) is mounted on the sensitive element, and the other 2 on the follow-up element of the instrument to which the invention is applied. In Fig. 4 the invention is shown as applied to a gyrocompass in which the follow-up element comprises the compass card 3, follow-up spider gear 4 and associate parts. Rotation of said element is caused by a reversible power motor 25, geared through suitable reduction gearing 25' to gear 4. The sensitive element comprises the gyroscope proper indicated generally at 5, from the vertical ring 5' of which rises a stem 6 through a hole 7 in the follow-up spider, said stem supporting the aforesaid element 1 of the controller. We prefer to place no windings on the sensitive element so that the element 1 comprises preferably merely a block of material of high magnetic permeability, such as soft iron, which normally completes the magnetic circuit of the part 2 placed on the follow-up element. The primary winding 8 of the transformer is preferably excited directly from a phase of the polyphase supply S, but the current flowing therethrough is rendered nearly constant by inserting a high resistance R in series therewith, making the resistance high as compared to the inductance. If desired a duplicate controller may be placed on the opposite side of the compass as shown at 1', 2', which may be used in parallel with the other transformer, or as a spare.

We prefer to employ normally balanced opposed secondary windings. Said windings may be placed both on the same side of the compass as shown in Fig. 4, one winding 9 being on one leg of the transformer and the other winding 10 on the opposite leg. If said windings are oppositely connected in series and are so wound that the potentials thereof are balanced when the movable armature 1 is central, then it will be seen that relatively slight movement of the two parts in one direction in the plane of the paper will, by causing an increase in the air gap on one side of the frame and a decrease on the other, cause an over-balancing potential in one direction, while a movement in the other direction will cause E. M. F. in the opposite direction or phase. Furthermore, as the currents permitted to flow in the secondaries 9 and 10 are practically zero, the potential difference between the free ends of the cross-connected coils being employed only to influence the control grid of a thermionic valve, there will be no measurable torque or pull exerted on the sensitive element irrespective of the relative positions of the control elements.

Fig. 1 shows one preferred method of actuating a power motor from the aforesaid variations in secondary potential of the transformer. The outer terminals of the cross-connected secondaries are connected to an amplifying unit or system preferably of the thermionic type. As shown, the said secondaries are connected between the grid 11 and the mid point of the filament 12. A suitable grid bias potential is maintained on the grid 11 in order to allow the selection of the correct working point on the grid-plate characteristic of said tube so that its amplifying action is practically symmetrical for positive and negative impulses on the grid. This grid bias is obtained from a D. C. source 20 by means of a potentiometer 20′, allowing accurate adjustment of the desired bias potential. The mid-point of said D. C. supply 20 is connected to the center tap of the secondary heating winding 17 of the power transformer 16, which supplies the necessary heating energy in the form of A. C. to the filament of said tube 12′ through regulating rheostats 60. Another separate D. C. source 19 is connected between the mid-point of the filament or the center tap of the heating transformer and the plate 12″ of said tube, including in the circuit the primary winding of a transformer 13. If the grid bias of this tube is correctly adjusted, the plate current of the same, passing through the plate circuit, will show the same fluctuations as the potential applied between grid and filament, and the potential difference between the terminals of the primary windings of the transformer will at any given time correctly duplicate the conditions on the grid with greatly increased magnitude. The A. C. potential between the grid and filament of said tube will, therefore, appear with enlarged amplitude but with the same phase relations regarding the current in coil 8 across the primary terminals of transformer 13, the A. C. being superimposed on a generally constant D. C. current. The transformer 13, a so-called push-pull input transformer serves two purposes. First, it further amplifies the potential on its input side, producing an A. C. of higher voltage but equal frequency on its secondary terminals. This secondary has a center tap, to which the filament mid-points of two parallel power thermionic tubes are connected, while the tubes are heated in parallel from the same heating winding 17. One terminal of the secondary of transformer 13 is connected to one of the grids 14 of the power tubes, the other terminal to the other grid 15. By using transformer 13 in this connection, it serves its second purpose, namely, to split its output and to control two tubes in opposite directions, thereby enlarging the overall output of the amplifying system. While the grid of one tube is influenced by the positive loops of the A. C., the other grid is influenced by the negative loops of the same A. C. The plate supply of the power tubes is raw A. C. taken out of the B-winding 18, one end of which is connected to the center tap of the heating winding, the other one being connected to the center tap of the primary of an output transformer 21, which has the outer terminals of said primary connected to the plates of the power tubes.

These tubes, if supplied with A. C. on the plate, act as rectifiers, i. e. they permit current to flow only in one direction. Therefore, only the positive loop of the raw A. C. "B" supply can flow through the "B" circuits, which is nothing but intermittent D. C., one positive loop for every full cycle.

Suitable negative C bias, taken from a D. C. supply, as explained above for tube 12′, serves to select the proper working point on the characteristic for best efficiency. While the positive loop (for instance) of the A. C. output of transformer 13 influences the grid of tube 14, the negative loop acts on grid of tube 15. The positive loop reduces, or even eliminates, the negative grid bias, or turns it positive. This results in a more or less pronounced enlargement of the normal plate current of that tube. In tube 15 the opposite happens, the negative loop adding to the negative grid bias, thereby reducing the plate current, which can be brought to zero.

The output of said amplifying unit may thus be employed as described above to actuate directly or indirectly the reversible motor. If so employed, however, the follow-up system is too sluggish for accurate gyrocompass use, the follow-up system in such case showing an appreciable lag and being essentially a non-hunting quiescent system. For accurate work it is necessary that there be as little lag as possible in the follow-up system and also it is desirable in most types of gyrocompasses to have a hunt in the follow-up support of the compass.

Both of these purposes are accomplished in our invention by a feed-back or regenerative coupling between the input of the motor and the input of the amplifying circuit. For this purpose we place a coil 26 in series with the input to the motor 25 and loosely and variably couple it to a coil 27 in the input to said tube 12. If desired, such a coupling may be placed at either or both input leads to the tube, the coupler 26—27 being placed in the grid end of the circuit and a similar circuit coupler 26′, 27′ being shown in the grid return.

If the motor receives a small impulse in one direction due to displacement of the armature, current starts to flow through coil 26, this current being in the correct phase relation to the potential in coil 27, as all phase angles in the whole system have been corrected by condensers (not shown). This current now induces an additional potential in coil 27, which is added to that already present there on behalf of the shift of the armature. The grid potential, therefore, is equal to the sum of both, which in turn increases the flow of output current from transformer 23; as this current again goes through coil 26, a boosting action is the result which so increases the torque in the motor that it is equal or larger than that at full speed, even though it is running very slowly. As soon as, however, the armature returns to neutral, this effect ceases automatically as there is again perfect balance in the circuit with no current in coil 26. The rise of the current in the motor is caused by the reduction of its impedance, and insofar it acts exactly like any other motor under load.

Another very essential feature is the variable coupling between 26 and 27. Extremely loose coupling reduces the booster action. At a certain amount of coupling the above described boosting will occur with automatic elimination at the neutral point, this being a non-hunting system. If we couple still closer, the action will not stop at the neutral point, but continue in the same direction for several thousandths of an inch until it suddenly snaps back into the opposite direction. The motor has no point of absolute standstill and will run either clockwise or counterclockwise, depending upon the negative distance of the electrical and mechanical zero point of the armature. This constitutes an ideal hunt system, no contacts and relays being used, with nothing to spark or wear. And, in addition, by varying the coupling, the amplitude and period of the hunt can be readily varied without touching any part of the compass itself.

In Fig. 1, we have shown the output of tubes 14 and 15 as actuating an A. C. reversible motor through an output transformer 21 having a center tap in the primary. For the output transformer the following happens. Under certain conditions in that half of the winding 21 which is connected to tube 14 a high intermittent D. C. is flowing, while the other half winding 22, connected to tube 15, carries practically no current. The secondary winding transforms the D. C. surges into regular A. C. of the same frequency though it may be distorted. Such a condition would result from a displacement of the armature 1 towards, say, pole 9 (Fig. 1). The current from the output side of the output transformer goes through a second transformer adapted to the motor voltage and energizes a winding 24 thereof, thereby producing torque in cooperation with winding 28. It has to be noted, that the current in the upper half of the primary of the output transformer can only flow in the direction of the arrow, while in the lower half it can only flow oppositely. This condition results in a change of phase of the output current as soon as the armature 1 moves over toward the other coil of the controller transformer, because then the grid potentials of the power tubes become influenced by a current 180° out of phase with the current described above, resulting in tube 15 emitting a high intermittent D. C., while the output of tube 14 drops to zero. The result is that in the primary of the output transformer the current has changed its direction, thereby producing at the output side an A. C. 180° out-of-phase with respect to the current described above. This means, that the phase of winding 24 of the motor has been reversed, thereby reversing the direction of rotation of the motor.

The power motor shown in this case is a special form of a poly-phase reversible motor in which three-phase current is employed to drive the same (see Patent No. 1,378,296). One of the stator windings 28, which may be termed the main winding, is connected between two phases of the supply and a tap 29 taken off said winding at a point between the ends, preferably near the center (similar to a Scott connection), said tap being connected to the third phase of the supply through the primary 8 of the controller-transformer. It will readily be apparent, therefore, that by reversing the phase relation of the current flowing through the winding 24 energized from the amplifying unit the motor will be reversed.

Figure 6:
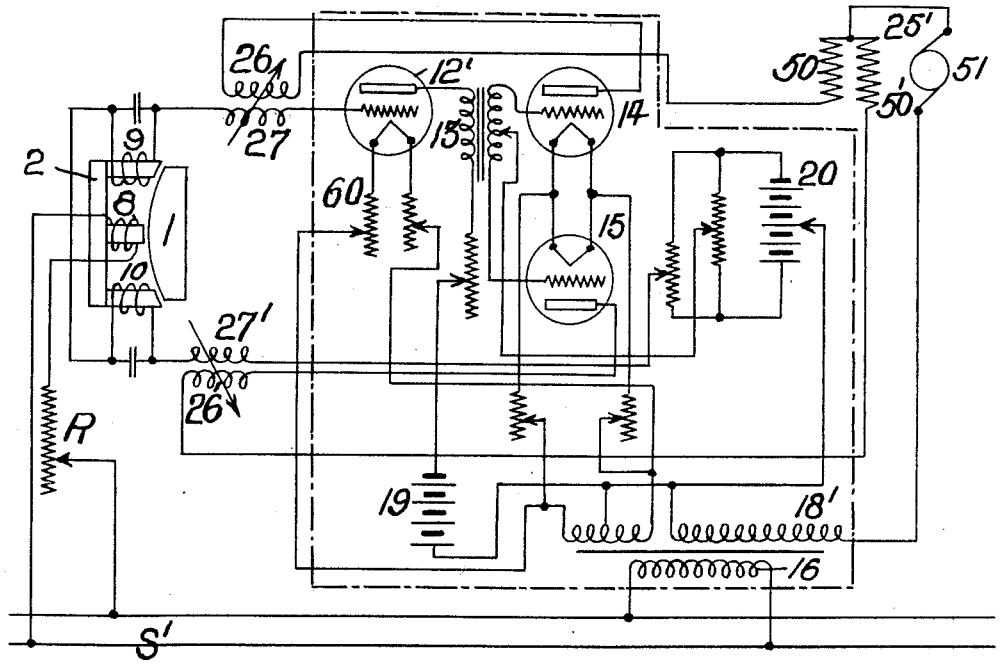
Fig. 6 is a diagram showing how an ordinary D. C. motor is employed as a power motor in our system.

If a D. C. power motor is desired it may be employed with even less parts than shown in Fig. 1. A simple means for actuating such a motor is shown in Fig. 6. This system needs only a single phase supply and may be substantially the same as in Fig. 1 down to the output side of the power tubes 14 and 15. Instead, however, of using output transformers, we connect the output of one tube 14 directly to a field winding 50 of motor 25' and the other tube 15 to a second field winding 50', the windings being connected at their common side in series with armature 51. The other side of the armature is connected to transformer winding 18' so that the motor is driven in either direction as a regular D. C. motor, because, as explained above, the power tubes give an output of intermittent D. C. The same booster action can be had as in Fig. 1 by supplying coil 26 with the D. C. output current of one tube and a second coil system at 26' with current from the other tube. The action is the same throughout, only the nature of the currents is different, these being intermittent D. C., which, however, act like A. C. on coils 27 and 27'.

Figure 2:
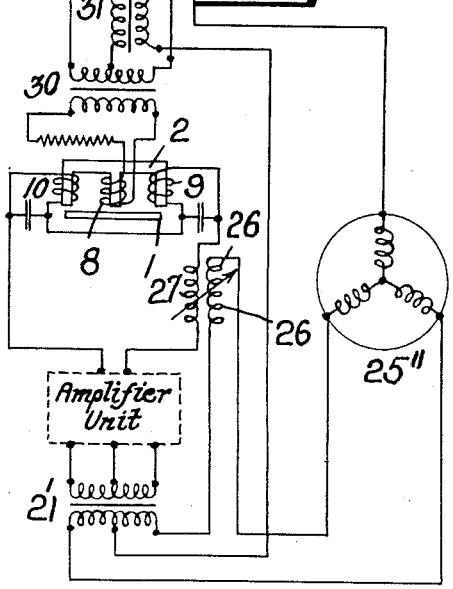
Fig. 2 shows a modified form employing an ordinary three-phase motor as a power motor with a Scott-connected transformer arrangement.
Figure 3:
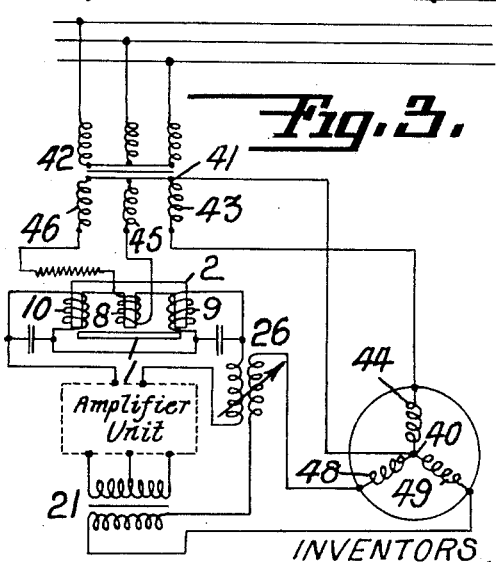
Fig. 3 shows a similar modification using a three-phase motor in which, however, a Y-connected transformer and motor are employed.

In Figs. 2 and 3 are shown means whereby a three-phase motor may be controlled from a follow-up of this character. According to these systems one phase of the three-phase motor 25'' is continuously excited directly or indirectly from one phase of the supply and the other two phases are controlled by the controller transformer, such that relative movement of the transformer in one direction or the other reverses the phase relation of the said two phases for driving the motor in either direction as required. In Fig. 2 the three phase supply is first split into two phases by means of Scott-connected transformers 30 and 31. One phase of the two phase output of said transformer serves to supply the primary winding 8 of the transformer controller. The output of said controller is amplified as before through the amplifying unit which may be similar to the amplifier unit described above, and the output of the amplifier unit is again carried to an output transformer 21'. If the transformer 21' were a simple transformer as shown at 21 in Fig. 1, but a single phase current would be produced. Accordingly, we make the transformer 21' as the tapped element of Scott connected transformers, the secondary thereof having a mid point connection (in effect) to the primary of a second transformer. Since the other phase of the two-phase output of transformers 30, 31 is, however, to be combined with one phase of the output of 21', instead of introducing another complete transformer into the system, we find that we can make use of the transformer 31 of the first mentioned Scott transformers so that said transformer 31 serves as one element of both the Scott transformers 30 and 21'. The three-phase motor then has one phase thereof excited from the supply and the other two phases excited from a combination of the output of said amplifying unit with the second phase of the two phase output of the first named Scott connected transformers, and it will readily be seen that the motor will be reversed upon a change in the phase relation of the two phases controlled from the amplifying unit with respect to the supply. The feed back coupler 26, 27 is retained as before.

In Fig. 3 the three-phase motor is of the Y-connected, four-wire, type and use is made of a Y-connected transformer instead of a Scott connected transformer. In this form the center point 40 of the motor is connected to the center point 41 of the secondaries of the Y-connected transformer 42. The first winding 43 of said secondary is shown connected to one winding 44 of said motor while the other two windings 45 and 46 are connected across the primary 8 of the transformer controller. The secondaries of said controller are connected as before to an amplifier unit and the output connected to the output transformer 21 which is connected preferably in series with the variable feed back coupler coil 26 to the other two windings 48—49 of said motor. It will readily be seen that this motor likewise will be reversed upon a change in the phase relation of the current in the windings 48—49 brought about by the movement of the controller as amplified in the amplifier unit.

The circuit in Fig. 5 is very similar to that in Fig. 2, except that the amplifier unit in this instance is shown in full. In Fig. 5, however, the C battery which is employed in Fig. 1 has been replaced by an extra winding 50'' on the main transformer 16', said winding being connected in such a manner as to supply the proper negative bias to the grids of the tubes. This has the advantage that the raw A. C. supplied as grid bias on the grids will amplify any changes in the phase of the initial input potential. The bias has a fixed phase itself, and, thereby, a change in the controlling potential will have a stronger effect, resembling oscillatory feed-back systems.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a follow-up system, the combination with the driven and controlling elements, opposed normally balanced transformers mounted on the driven element, unwound magnetic means on the controlling element for varying the differential output of said transformers without exerting appreciable torque on said controlling element, a thermionic tube circuit for amplifying the differential output of said transformers, a reversible motive means operated from the output of said circuit to drive said driven element, and a feed back coupling between the input of said motive means and the input of said tube circuit for increasing the starting and slow speed torque of said motive means.

2. A non-contacting non-current-carrying electrical means for causing the supporting element of a sensitive element to follow the movements thereof and maintain a hunt or vibration about the neutral point comprising the combination with the said elements, opposed variable magnetic circuits, one part of each of which is on each of said elements, opposed inductive windings forming a part of said circuits and on the follow-up element, regenerative amplifying means controlled by said inductive means including a variable coupling for varying the magnitude and frequency of the hunt, and motive means controlled thereby for turning said supporting element in either direction.

3. In an A. C. follow-up system, the combination with the polyphase supply, sensitive and follow-up elements, of an A. C. motor for driving said follow-up element normally excited from a part of the supply, variable gap transformers mounted on one of said elements and having the primary windings thereof excited from said supply, some of the windings thereof being cross-connected, unwound magnetic means on the other element providing the variable gap of said transformers, amplifying means including a feed back circuit actuated from said transformers, said motor being actuated from said means and from another part of said supply.

4. In an A. C. follow-up system, the combination with the polyphase supply, sensitive and follow-up elements, of an A. C. motor for driving said follow-up element normally excited from a part of the supply, variable gap transformers 80 mounted on said elements and having the primary windings thereof excited from said supply, some of the windings thereof being cross-connected, amplifying means including a feed back circuit including a variable coupler for varying 85 the magnitude and frequency of the hunting action of said motor and actuated from said transformers, the output of said amplifying means being also connected to said motor.

5. In an inductive follow-up system, the combination with the controlling element and following element, opposed windings mounted on one of said elements adapted to have normally balanced potentials induced therein, unwound magnetic means on the other element for disturbing the balance of said induced potentials, a thermionic amplifying means connected to the output of said windings, a reversible follow-up motor adapted to be driven in either direction according to the output of said circuit, and a feed back circuit between said output and the input to said circuit.

6. In a system for controlling the rotation of a three phase motor, of means for transforming the three phase supply into two phase, non-contacting variable inductive elements responsive to relative movement and excited from one of said last-named phases, an amplifying unit having the input side thereof connected to the secondaries of said inductive elements, means for combining the output of said unit with the second phase of said first mentioned two phase input, said motor being connected to a phase of the supply and with said combined output of said unit so as to be supplied with three phase current in such a manner that a minute variation in the magnitude or phase of the E. M. F.'s induced in said elements produces large flow of current of the proper phase to cause rotation of the motor in one direction or the other dependent on the phase relation of the output to the supply to the motor.

7. In a follow-up system for precision instruments having a vibratory or hunting element and a sensitive element, the combination with a power motor for driving the former, an amplifier unit having the output thereof connected to a winding of said motor, a feed back vario-coupler between the input to said motor and the input to said unit, whereby the magnitude and frequency of the hunt may be varied, means connected to the input of said unit and adapted to have the impedance thereof varied by relative movement of the follow-up and sensitive elements, and a source of A. C. connected to said means and to said motor.

8. In a follow-up system for precision instruments having follow-up and sensitive elements, the combination with a power motor for driving the former, an amplifier unit having the output thereof connected to a winding of said motor, a feed back coupler between the input to said motor and the input to said unit, means for varying said coupler whereby a hunting action of the follow-up may be caused or varied at will, means connected to the input of said unit and adapted to have the impedance thereof varied by relative movement of the follow-up and senstive elements, and a source of A. C. connected to said means and to said motor.

9. In a remote control or follow-up system, the combination with the driven and controlling elements, opposed normally balanced transformers mounted on one of said elements, magnetic means on the other element for varying the differential output of said transformers, a thermionic tube circuit for amplifying the differential output of said transformers, a reversible motive means operated from the output of said circuit to drive said driven element, a feed back coupling between the input of said motive means and the input of said tube circuit for increasing the starting and slow speed torque of said motive means, and means for varying the closeness of said coupling for the purpose specified.

10. In a follow-up system, the combination with the polyphase supply, sensitive and follow-up elements, of a motor for driving said follow-up element normally excited from a part of the supply, variable gap transformers having the primary windings thereof excited from said supply, and two of the windings thereof being cross-connected, all of said windings being on the follow-up element, amplifying means including a feed back circuit actuated from the secondaries of said transformers, including means for maintaining and adjusting the hunting action of the motor, the output of said amplifying means being also connected to said motor.

BRUNO WITTKUHNS.
FREDERIC M. WATKINS.